(12) United States Patent
Kornbluth et al.

(10) Patent No.: US 11,444,292 B2
(45) Date of Patent: Sep. 13, 2022

(54) ANTICORROSIVE AND CONDUCTIVE MATERIAL

(71) Applicant: Robert Bosch GmbH, Stuttgart (DE)

(72) Inventors: Mordechai Kornbluth, Brighton, MA (US); Soo Kim, Cambridge, MA (US); Jonathan Mailoa, Cambridge, MA (US); Lei Cheng, Sunnyvale, CA (US); Georgy Samsonidze, San Francisco, CA (US); Boris Kozinsky, Waban, MA (US); Nathan Craig, Santa Clara, CA (US); Saravanan Kuppan, Sunnyvale, CA (US); Sondra Hellstrom, East Palo Alto, CA (US); Jake Christensen, Elk Grove, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 779 days.

(21) Appl. No.: 16/233,575

(22) Filed: Dec. 27, 2018

(65) Prior Publication Data
US 2020/0212455 A1    Jul. 2, 2020

(51) Int. Cl.
*H01M 8/0245*   (2016.01)
*C25D 9/04*   (2006.01)
*C25D 7/06*   (2006.01)
*H01M 8/021*   (2016.01)

(52) U.S. Cl.
CPC ........ *H01M 8/0245* (2013.01); *C25D 7/0614* (2013.01); *C25D 9/04* (2013.01); *H01M 8/021* (2013.01)

(58) Field of Classification Search
CPC .. H01M 8/0245; H01M 8/021; H01M 8/0228; H01M 2008/1095; C25D 7/06; C25D 9/04; C25D 7/0614; C25D 5/48; Y02E 60/50
See application file for complete search history.

(56) References Cited

U.S. PATENT DOCUMENTS

| | | | | |
|---|---|---|---|---|
| 3,799,422 A | * | 3/1974 | Matsumoto | G11B 15/605 242/615.4 |
| 2007/0018214 A1 | * | 1/2007 | Ahn | H01L 21/02186 438/785 |
| 2008/0035970 A1 | * | 2/2008 | Wang | H01L 21/76841 257/295 |

(Continued)

FOREIGN PATENT DOCUMENTS

| | | |
|---|---|---|
| CN | 103489766 A | 1/2014 |
| WO | 2014156497 A1 | 10/2014 |

OTHER PUBLICATIONS

Sharma et. al. J Nanopart Res (2016) 18:83 (Year: 2018).*

(Continued)

*Primary Examiner* — Alexander Usyatinsky
(74) *Attorney, Agent, or Firm* — Brooks Kushman P.C.

(57) ABSTRACT

An anticorrosive and conductive substrate includes a bulk portion and a surface portion including a magnesium titanium material having a formula (I) $Ti_xMg_{1-x}O_y$ (I), where x is a number from 0 to $\leq 1$ and y is a number from 1 to $\leq 2$, and wherein at least about 50% of the magnesium titanium material has a cubic crystal structure, and wherein the magnesium titanium material is configured to impart anticorrosive and conductive properties to the substrate.

16 Claims, 3 Drawing Sheets

(56) References Cited

U.S. PATENT DOCUMENTS

| | | | |
|---|---|---|---|
| 2012/0186644 A1* | 7/2012 | Ko | B82Y 10/00 977/773 |
| 2015/0371787 A1* | 12/2015 | Ko | H01G 9/2059 438/82 |
| 2017/0117290 A1* | 4/2017 | Lee | H01L 23/528 |

OTHER PUBLICATIONS

JP 01090412 (Abstract) (Year: 1989).*

Zhang et. al. Nano Research 2016, 726-734 (Year: 2016).*

Urvashi Sharma et al., "Synthesis of Titanium-doped MgO heteronanostructures with tunable band gap", J. Nanopart Res (2016) 18:83, pp. 1-20.

Urvashi Sharma et al., "Layere Doubled Hydroxides as Precursors to Ti4+ Doped MgO Nanoparticles with Tunable Band Gap,", Journal of Nanoscience and Nanotechnology, vol. 18, 264-278, 2018, No. 1, pp. 264-278.

Alessandro Dondoni et al., Asymmetric Organocatalysis: From Infancy to Adolescence, Angew. Chem. Int. Ed 2008, 47, pp. 4638-4660, www.angewandte.org.

A. Issa, et al., "Formation of High-Strength β' precipitates in Mg-RE alloys: The role of the Mg/β" interfacial instability," Elsevier, ScienceDirect, Acta Materialia 83 (2015) pp. 75-83.

Taro Kinumoto et al., "Anticorrosion Properties of Tin Oxide Coatings For Carbonaceous Bipolar Plates of Proton Exchange Membrane Fuel Cells," Journal of Power Sources, 249 (2014) pp. 503-508.

Jens K. Norskov et al., "Density Functional Theory in Surface Chemistry and Catalysis," PNAS, Jan. 18, 2011, vol. 108, No. 3, pp. 937-943.

Thomas M. Ostergaard et al., "Oxidation of Ethylene Carbonate on Li Metal Oxide Surfaces," The Journal of Physical Chemistry, 2018, 122, pp. 10442-10449.

B.M. Pabon et al., "Formation of titanium monoxide (001) single-crystalline thin film induced by ion bombardment of titanium dioxide (110)", Nature Communications, 2015, www.nature.com/naturecommunications, pp. 1-6.

Ruoshi Sun, "First-principles electronic structure and relative stability of pyrite and marcasite: Implications for photovoltaic performance," Physical Review B 83, 235311 American Physical Society, (2011), pp. 235311-1-236311-12.

Taku Suzuki et al., "TiO epitaxial film growth on MgO(001) and its surface structural analysis," Surface Science 445 (2000) pp. 506-511.

* cited by examiner

ANTICORROSIVE AND CONDUCTIVE MATERIAL

TECHNICAL FIELD

The disclosure is directed to an anticorrosive and conductive material, and in some embodiments, magnesium-titanium-based material that is electrically conductive, but chemically inert and may be used to impact anticorrosive and electrically conductive properties onto a substrate, and a method of producing the same.

BACKGROUND

Metals have been a widely used material for thousands of years. Various methods have been developed to preserve metals and prevent their corrosion or disintegration into oxides, hydroxides, sulfates, and other salts. Metals in some industrial applications are especially susceptible to corrosion due to operating environments. A non-limiting example may be metal components of a fuel cell and its bipolar plate (BPP). In addition, certain components such as the BPP are required to be not only sufficiency chemically inert to resist degradation in the highly corrosive environment of the fuel cell, but also electrically conducting to facilitate electron transfer for the oxygen reduction reaction of the fuel cell. Finding a material that meets both the criteria has been a challenge.

SUMMARY

In at least one embodiment, an anticorrosive and conductive substrate is disclosed. The substrate may include a bulk portion. The substrate may further include a surface portion including a magnesium titanium material having formula (I)

$$Ti_xMg_{1-x}O_y \qquad (I),$$

where x is a number from 0 to ≤1 and y is a number from 1 to ≤2, and wherein at least about 50% of the magnesium titanium material includes MgO and TiO having cubic crystal structures. The magnesium titanium material is configured to impart anticorrosive and conductive properties to the substrate. The magnesium titanium material may include less than about 10 atomic % Ti. The magnesium titanium material may include more than about 10 atomic % Ti such that the material further includes MgO and TiO nanodomains. The TiO nanodomains may be electrically conductive. Electrical conductivity of the material may be greater than about 100 S cm$^{-1}$. An interfacial contact resistance between the substrate and the coating may be less than about 0.1 Ohm cm$^2$. The bulk portion may be steel. The bulk portion may be glass and the material may be configured to form a transparent film on the surface portion.

In an alternative embodiment, a bipolar plate (BPP) for a proton-exchange-membrane fuel cell (PEMFC) is disclosed. The BPP may include a metal substrate having a bulk portion and a surface portion including an anticorrosive, conductive material. The material may have a formula (II)

$$M_xA_{1-x}O_y \qquad (II),$$

where M is a transition metal or post-transition metal, A is an alkaline metal or alkaline earth metal, x is a number from 0 to ≤1, and y is a number from 1 to ≤2. A corrosion resistance of the coating may be less than about 10 µA cm$^{-2}$ at about 80° C., at pH of about 3, with the presence of ~0.1 ppm of HF in the solution. Electrical conductivity of the material may be greater than about 100 S The material may have at least 50% of a cubic crystal structure. The bulk portion may include steel. M may include Ti and A may include Mg. The material may include MgO and TiO nanodomains, each nanodomain measuring between about 1 and 100 nm in radius. The TiO nanodomains may be electrically conducting and the MgO domains are electrically insulating. An interfacial contact resistance between the bulk portion and the anticorrosive, conductive material may be less than about 0.1 Ohm cm$^2$.

In yet another embodiment, a method of producing a magnesium titanium anticorrosive and conductive material is disclosed. The method may include oxidizing a Ti$_x$Mg$_{1-x}$ intermetallic alloy in a substantially oxygen-free environment to generate a Ti$_x$Mg$_{1-x}$O$_y$ material, where x is a number from 0 to <1, y is a number from 1 to <2, and a ratio of Ti:Mg is less than 1:2. The method may also include oxidizing the Ti$_x$Mg$_{1-x}$O$_y$ material to form substantially chemically inert and insulating MgO regions and electrically conductive TiO regions. The magnesium titanium anticorrosive and conductive material may include less than about 10 atomic % Ti. The method may further include depositing the Ti$_x$Mg$_{1-x}$ intermetallic alloy onto a substrate by electrochemical deposition. The method may include controlling a degree of oxidation by introducing oxidizing and/or reducing agent(s). The method may include forming the Ti$_x$Mg$_{1-x}$ intermetallic alloy at a temperature above about 100° C.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Metals present a widely used group of materials in numerous industries including automotive, construction, home appliances, tools, pipes, railroad tracks, coinage, etc. Metals have been utilized by humankind for thousands of years and have remained a material of choice for certain applications due to their properties such as strength and resilience. Yet, corrosion of metals is a major source of fatigue and lifetime limitations for a number of applications using metals as the raw materials.

Corrosion is a natural process which converts a refined metal to a more chemically-stable form such as the metal's oxide(s), hydroxide(s), sulfide(s), and/or other salts. The conversion presents a gradual destruction of the metal material caused by electrochemical oxidation of the metal in reaction with an oxidant such as oxygen or sulfates. Corrosion may be invoked by exposure of the metal substrate to moisture in the air, to a solution with a relatively low pH, various chemical substances such as acids, microbes, elevated temperatures, and/or other factors. Especially in acidic environments, corrosion starts at the interface between a bulk metal material (e.g., steel) and a solution (e.g., ions dissolved in water or water surface layer which react to degrade the bulk material).

Many efforts have been made to prevent or slow down corrosion of metals. For instance, various types of coatings have been developed. Example coatings include applied coatings such as paint, plating, enamel; reactive coatings including corrosion inhibitors such as chromates, phosphates, conducting polymers, surfactant-like chemicals designed to suppress electrochemical reactions between the environment and the metal substrate; anodized surfaces; or biofilm coatings. Other methods of corrosion prevention include controlled permeability formwork, cathodic protection, or anodic protection.

Yet the most popular solution to the corrosion problem remains to be fortifying of the vulnerable metal surface with a coating. Most corrosion-resistant surfaces thus include one or more chemically inert coatings or protective layers that can slow down and/or at least partially prevent corrosion from occurring. Still, it has remained a challenge to find a material with substantial anticorrosion properties which would be also non-toxic, gentle to the environment, economical, while having superb performance characteristics.

Moreover, some applications are highly susceptible to corrosion due to their environmental factors. A non-limiting example of such application are proton-exchange-membrane fuel cells (PEMFC). The PEMFC represents an environmental-friendly alternative to internal combustion engines for a variety of vehicles such as cars and buses. The PEMFC typically features a relatively high efficiency and power density. A very attractive feature of the PEMFC engine are no carbon emissions, provided that the hydrogen fuel has been gained in an environmentally-friendly manner. Besides being a green engine, the PEMFC may be used in other applications such as stationary and portable power sources.

The PEMFC own operating environment lends itself to corrosion for a variety of reasons. For example, low voltages exist between startups and shutdowns of the PEMFC, PEMFC has a strongly acidic environment, fluorine ions are released from the polymer membrane during operation of the PEMFC, both $H_2$ and $O_2$ exist at the anode during the startup and shutdown which causes high cathodic potential yielding cathodic corrosion, fuel crossover of hydrogen or oxygen from the anode to cathode or vice versa, etc. The PEMFC thus requires durable components capable of withstanding the above-mentioned conditions.

Figure 1:
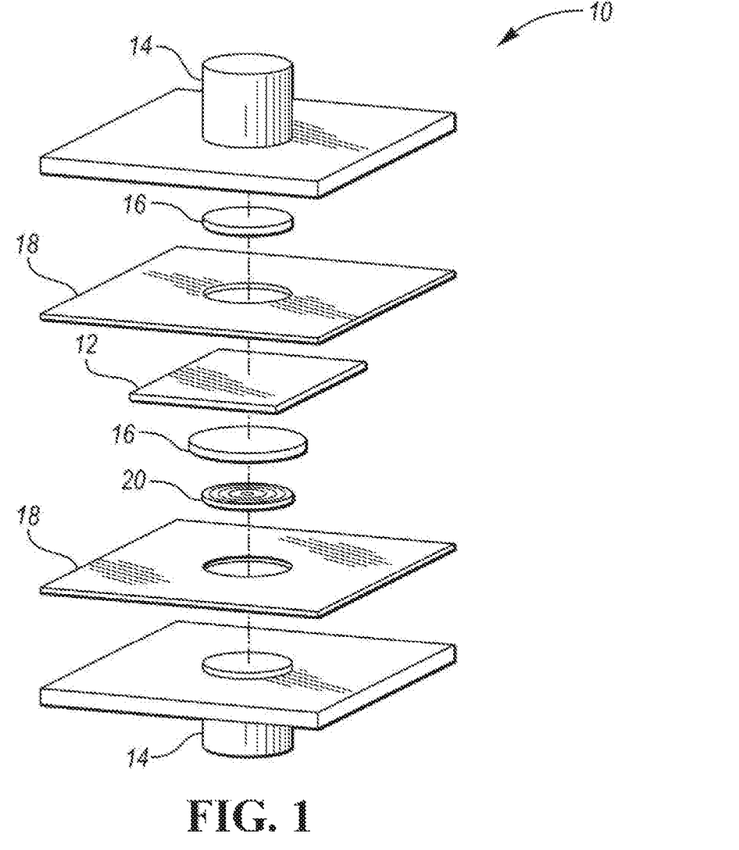
FIG. 1 depicts a schematic composition of a proton-exchange-membrane fuel cell including a bipolar plate according to one or more embodiments.

A non-limiting example of a PEMF cell is depicted in FIG. 1. A core component of the PEMFC 10 that helps produce the electrochemical reaction needed to separate electrons is the Membrane Electrode Assembly (MEA) 12. The MEA 12 includes subcomponents such as electrodes, catalysts, and polymer electrolyte membranes. Besides MEA 12, the PEMFC 10 typically includes other components such as current collectors 14, gas diffusion layer(s) 16, gaskets 18, and bipolar plate(s) 20.

The bipolar plates or BPP 20 are implemented in a PEMFC stack to distribute gas, collect current, and separate individual cells in the stack from each other. The BPP 20 also provides additional functions such as removal of reaction products and water as well as thermal management within the PEMFC 10. The BPP 20 thus forms a crucial part of the PEMFC. The BPP 20 is also a relatively expensive component and a frequent reason for degradation of the PEMFC system. For example, BPPs may constitute about 60-80% of the stack weight, about 50% of the stack volume, and about 25-45% of the stack cost. To keep the cost low, the BPP 20 is typically made from metal, specifically steel such as stainless steel. Alternative materials such as aluminum may be used. As the metal plates are susceptible to corrosion within the PEMFC system, efforts have been made to prevent the corrosion.

Additionally, in the PEMFC 10, the BPP 20 presents a yet another material challenge as the BPP 20 is also required to be electrically conducting to facilitate electron transfer for the oxygen reduction reaction. Therefore, the BPP 20 material needs to be electrically conducting but chemically inert to reactions with ions present in the PEMFC 10 environment.

Typically, the BPP metal surface contains a coating such as graphite-like coating or protective oxide or nitride coatings to increase corrosion resistance of the BPP 20. The BPP's 20 surface may thus include elements such as Fe, Cr, Ni, Mo, Mn, Si, P, C, S, or a combination thereof. Alternative coatings include Ti alloy, doped $TiO_x$, TiN, CrN, or ZrN. Yet, in an aggressively corrosive environment such as in the PEMFC 10, where coatings are more likely to degrade faster, a need remains for a coating that would be economically feasible, corrosion resistant, protective against acids such as HF at PEMFC operating temperature of about 80° C., electronically conductive, and capable of forming a coherent interface (i.e., a small interfacial contact resistance) with the metal substrates at the same time.

Figure 2:
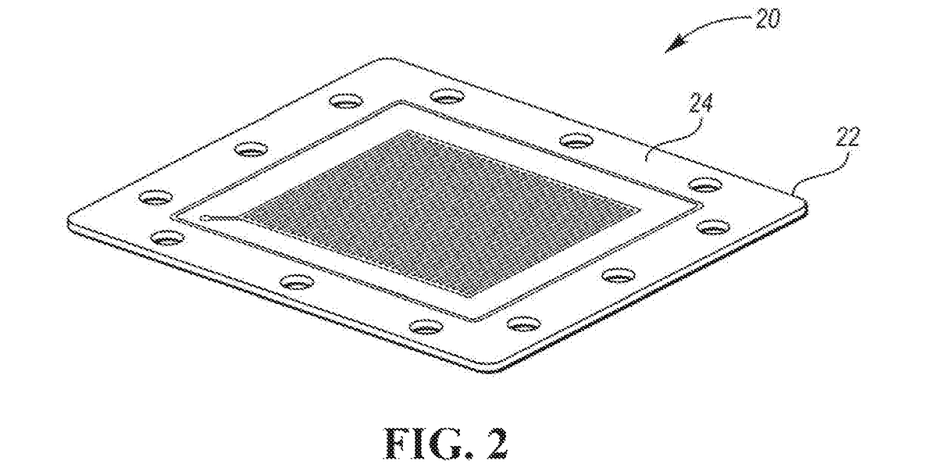
FIG. 2 shows a perspective view of a non-limiting example of a bipolar plate having a bulk portion and a surface portion including an anticorrosive and electrically conductive material according to one or more embodiments.

A material disclosed herein solves one or more problems described above and/or provides the benefits identified herein. A non-limiting example of a BPP 20 is shown in FIG. 2. The BPP 20 represents a non-limiting example of a substrate having a solid body or bulk portion 22 and a surface portion 24. The bulk portion 22 may be formed from a metal such as steel, stainless steel, aluminum, copper, an alloy of two or more metals, the like, or a combination thereof. Alternatively, the bulk portion 22 may be formed from a composite material such as carbon-carbon composite, carbon-polymer composite. Alternatively still, the bulk portion 22 may be made from graphite.

The surface portion 24 includes an anticorrosive, chemically inert, and electrically conductive material. The entire area of the surface portion 24 may include the material. Alternatively, the surface portion 24 may include one or more sub portions which are free from the material. Preferably, the entire surface portion 24 includes the material such that the entire BPP 20 is protected against corrosion. In other applications such as non-BPP applications, only a small portion of the surface portion 24 may include the material such less than ½, ¼, ⅛, 1/16, 1/32, or the like of the surface portion may include the material.

The surface portion 24 may include one or more layers of the material. The material thickness on the surface portion 24 may be adjusted according to needs of a specific application. For example, the material may form a relatively thin film such that the material forms a transparent film. A non-limiting example of the material layer thickness may be about 0.1 to 0.8 µm, 0.2 to 0.6 µm, or 0.3 to 0.5 µm. Alternatively, the material may be layered to form a relatively thick deposit with dimensions of more than 1 µm on the surface portion 24. The material may form one or more layers or a plurality of layers on the bulk portion 22. The material may form 1, 2, 3, 4, 5, 6, 7, 8, 9, 10, or more layers on the bulk portion 22.

The material may be a magnesium titanium material having a formula (I)

$$Ti_xMg_{1-x}O_y \qquad (I),$$

where x is a number from 0 to ≤1, and y is a number from 1 to ≤2.

Alternatively, the material may have a formula (II)

$$M_xA_{1-x}O_y \qquad (II),$$

where M is a transition metal or post-transition metal, A is an alkaline metal or alkaline earth metal, x is a number from 0 to ≤1, and y is a number from 1 to ≤2.

M in the formula (II) may be a transition metal from Groups 2B-8B. Non-limiting examples of suitable transition metals may include Zn, Cd, Sc, Ti, Zr, Hf, V, Nb, Ta, Cr, Mo, W, Mn, Re, Ru, Co, Rh, Ir, Ni, Zn, or the like. M may also be a post-transition metal from Groups 3A-6A. Non-limiting examples of suitable post-transition metals may include Al, Sn, Bi, or the like.

The material according to the formulas (I) and (II) includes a mixture of two oxides, a first oxide having an electrically insulating, substantially chemically inert phase such as MgO and a second oxide having an electrically conductive phase such as TiO. The insulating phase of the first oxide helps to stabilize the conductive phase of the second oxide. The coating is not only electrically conducting, but also chemically inert such that the coating is substantially unreactive with ions in an acidic solution such as $H^+$, $F^-$, etc. The material is thus electrically conductive and anticorrosive at the same time.

The material may include less than about 10 atomic % of Ti. Atomic percent relate to the percentage of one kind of atom relative to the total number of atoms. For example, the material may include about 1 to 9.9 atomic % of Ti, 2 to 8 atomic % of Ti, or 3 to 7 atomic % of Ti. Alternatively, the material may include about 1 to 3 atomic % of Ti, 1.5 to 2.8 atomic % of Ti, or 1.7 to 2.5 atomic % of Ti. The material may include about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, or 9.9% atomic % of Ti.

The concentration of Ti influences the structure of the material. At a low concentration of Ti, the system is Mg-rich, and at least a portion of the material may form a phase of long-range order, where TiO and MgO both have a cubic crystal structure. The low concentration may be either below about 3 at. % at ambient temperature or below about 10 at. % at elevated temperature or pressure. The low concentration may be any concentration of Ti below about 10 at. % listed above, specifically about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, or 9.9 atomic % of Ti. The material may thus have predominantly or substantially cubic crystal structure, isometric crystal system, or rocksalt crystal structure. The material may have at least about 50% of a cubic crystal structure. The material may have at least about 50, 55, 57, 60, 62, 65, 67, 70, 72, 75, 77, 80, 82, 85, 90, 92, or 95% of a cubic crystal structure. About 50 to 90%, 55 to 85%, or 60 to 80% of the material may have a substantially cubic crystal structure.

Within the cubic crystal structure, caused by the Mg-rich composition of the material, Ti is slightly immiscible, but forms stable interfaces. Even though TiO has a natural tendency to oxidize into unconducive $TiO_2$, for purposes of this disclosure, it is desirable to obtain and keep TiO in the conducting phase instead of obtaining the insulating $TiO_2$.

Beneficially, the TiO/MgO interfaces have been identified as more stable than $TiO_2$/MgO interfaces. The reason for the less stable interface of $TiO_2$/MgO may lie in the fact that $TiO_2$ does not have a cubic crystal structure such as MgO. Rather, $TiO_2$ may have five different structures, most commonly occurring as anatase or rutile. Anatase is a polymorph of $TiO_2$ forming distinct and unique crystals. Similarly, rutile is another polymorph of $TiO_2$ and the most common natural form of $TiO_2$. Neither have the cubic crystal structure like MgO. As a result, the $TiO_2$/MgO interface has a mismatched structure, which may render it less stable than the TiO/MgO interface featuring matching cubic crystal structures.

Additionally, the interfacial energy between TiO/MgO is negative, indicating stability while the interfacial energy between $TiO_2$/TiO is positive at +3.2 J/m². The interfacial energy between TiO and MgO may be calculated using first-principles density functional theory (DFT) calculations. The interfacial energy between TiO/MgO has a negative value of −1.23 J/m². The interfacial energy was calculated using formula (III):

$$E_{inf} = [E_{0,total} - n(E_{0,MgO} + E_{0,TiO})]/(2A) \quad (III),$$

where $E_{0,total}$, $E_{0,MgO}$, and $E_{0,TiO}$ are DFT calculated energies of the interface structure MgO and TiO (constrained in MgO lattice parameters), n is the number of formula units in the interface structure, and A is the area of the interface.

A negative interfacial energy indicates that MgO and TiO interfaces are energetically favored to spontaneously form throughout the matrix, leading to ordered planes of MgO and TiO. In other words, certain ordered arrangements of TiO and MgO are more energetically stable than the TiO+MgO phase separation discussed below. Additionally, due to much larger interfacial energy between TiO and $TiO_2$, the $Ti_xMg_{1-x}O$ material may substantially resist oxidation from the TiO cubic crystalline structure into a $TiO_2$ phase.

A higher amount of Ti may increase the overall conductivity of the material, but at the same time, stability of the material may be lowered. At higher concentrations of Ti than at about 3 or more atomic % of Ti at ambient temperature, or at about 10 atomic % at an elevated temperature, at least a portion of the material may weakly phase-separate into nanodomains, forming a distinct nanodomain region. The concentration of Ti in the system supporting the weak phase-separation into the nanodomains may be greater than about 3 at. % at ambient temperature or 10 at. % at elevated temperatures and lower than about 15, 20, 25, 30, 33, 35, 38, 40 at. % of Ti. The material may thus include one or more TiO nanodomains that remain electrically conductive and MgO nanodomains that remain electrically insulating. Each nanodomain may measure between about 1 and 100 nm, 10 and 80 nm, or 20 and 60 nm in radius.

Alternatively, at the concentrations of Ti higher than about 3 or more atomic % of Ti at ambient temperature, or at about 10 atomic % at an elevated temperature, at least a portion of TiO may form a solid solution with MgO. A solid solution is a solid mixture containing a low concentration component uniformly distributed within the crystal lattice of the high concentration component. The solid solution may thus include TiO uniformly distributed within the crystal structure of MgO.

At Ti concentrations greater than about 25, 30, or 33.3 atomic %, and especially under exposure to oxygen causing at least some of the TiO domains to oxidize, one or more ordered Mg—Ti—O compounds may form within the $Ti_xMg_{1-x}O$ system rather than a solid solution or nanodomains. At least some of the ordered Mg—Ti—O compounds may be conducting. Table 1 discloses non-limiting examples of the ordered Mg—Ti—O compounds, calculated formation energy of the compounds, whether the compound is Mg-rich, and bandgap. The ordered Mg—Ti—O compounds are further compared to MgO, TiO, and $TiO_2$ in the Table 1 below.

TABLE 1

Non-limiting examples of ordered Mg—Ti—O compounds and their properties in comparison to MgO, TiO, and $TiO_2$

| Compound | DFT Formation Energy [eV/atom] | Equivalent Composition | TiO/(TiO + MgO) [%] | Bandgap [eV] |
|---|---|---|---|---|
| $Mg_2Ti_7O_{15}$ | −3.314 | 2MgO—7TiO—3$O_2$ | 77.8 | 0.0 |
| $Mg_2TiO_4$ | −3.164 | 2MgO—TiO—½$O_2$ | 33.3 | 3.4 |
| $Mg_3Ti_9O_{20}$ | −3.317 | 3MgO—9TiO—4$O_2$ | 75.0 | 0.0 |
| $Mg_5Ti_{13}O_{30}$ | −3.318 | 5MgO—13TiO—6$O_2$ | 72.2 | 0.0 |
| $Mg_{11}Ti_{25}O_{60}$ | −3.320 | 11MgO—25TiO—12$O_2$ | 69.4 | 0.03 |
| $MgTi_2O_5$ | −3.318 | MgO—2TiO—$O_2$ | 66.7 | 2.7 |
| $MgTi_5O_{10}$ | −3.304 | MgO—5TiO—2$O_2$ | 83.3 | 0.0 |
| $MgTiO_3$ | −3.255 | MgO—TiO—½$O_2$ | 50.0 | 3.5 |
| MgO | −2.923 | MgO | 0 | 4.7 |
| TiO | −2.572 | TiO | 100 | 0.0 |
| $TiO_2$ | −3.396 | TiO—½$O_2$ | 100 | 2.7 |

The material may thus have various structures and morphology of MgO—TiO phase mixtures depending on concentration of Ti as well as preparation conditions such as choice of precursor(s), heat treatment, pH, pressure, temperature, the like, or a combination thereof. Overall, the material of formula (I) or (II), if Mg-rich such that concentration of atomic Ti is less than about 10, 9, 8, 7, 6, 5, 4, 3, 2 or 1 at. %, provides a stable interface of electrically insulating, but stable MgO and electrically conductive TiO.

The value of about 3 to 10 at. % thus represents a first threshold. If the Ti concentration is below the first threshold, the material may include predominantly MgO and TiO having cubic crystal structures. If the Ti concentration is above the first threshold, the material may contain TiO and MgO nanodomains or solid solution of TiO in MgO as well as MgO and TiO having cubic crystal structures.

The value of about 30 to 33 at. % represents a second threshold. If the Ti concentration is below the second threshold, the material may include TiO and MgO nanodomains, solid solution of TiO in MgO, and/or MgO and TiO having cubic crystal structures. If the Ti concentration is above the second threshold, the material may include one or more ordered Mg—Ti—O compounds.

Due to its composition, structure, and morphology, the material may have the following desirable properties: corrosion resistances of the overall material may be less than about 1 µA cm⁻² at 80° C., at pH=3, with the presence of ~0.1 ppm of HF in the solution or at least less than about 0.5 to 10, 1 to 8, or 1.5 to 5 µA cm⁻² at the same operating conditions; the electrical conductivity of the coating may be greater than about 100 to 150, 110 to 140, or 120 to 130 S cm⁻¹; the electrical conductivity of the coating may be between about 0.1 and 100, 1 and 80, or 10 and 50 S cm⁻¹; the interfacial contact resistance between the substrate and the material may be less than about 0.01 Ohm cm², the interfacial contact resistance between the substrate and the material may be less than about 0.001 to 0.2, 0.01 to 0.09, or 0.1 to 0.05 Ohm cm².

While the BPP has been described as a suitable application for the material of formulas (I) and (II) above, the material may be likewise suitable for additional uses. For example, the material of formulas (I), (II) may be used as part of surface portion of other industrial applications requiring a chemically inert, conductive material such as batteries, photovoltaics, consumer electronics, and/or anywhere else a conducting and inert oxide would be beneficial. Additionally, a surface portion of an applicable device may include a relatively thin film formed from the material such that the film is transparent. The material may thus perform as a transparent conducting oxide film, which may be utilized, for example, in photovoltaics. The material's application is thus not limited to metals, but rather to any substrate requiring chemically inert and electrically conductive properties. The substrate may thus be glass, ceramic, composite, polymeric, and the like.

EXAMPLES

Examples 1-3

The DFT calculation was used to assess the surface phenomenon of different materials proposed for use on the surface portion of a BPP with the chemicals present in the PEMFC environment, specifically $H^+$ and $F^-$. Example 1 represents MgO, Example 2 TiO, and Example 3 $TiO_2$. A single-atom adsorption of $H^+$ and $F^-$ was used to represent the chemical molecules of $H_3O^+$ and HF that are largely present in the fuel cell environment.

Table 2 shows DFT calculated adsorption energies of $H^+$ and $F^-$ on cubic crystal MgO and TiO structures. For the reference, the DFT adsorption energies of the anatase $TiO_2$ and $Cr_2O_3$ are also provided in Table 2.

TABLE 2

Adsorption energies of $H^+$ and $F^-$ on cubic crystal MgO and TiO structures as well as $TiO_2$ and $Cr_2O_3$

| Surfaces | H adsorption FT energy [eV] | F adsorption DFT energy [eV] | Experimental conductivity [S/m] |
|---|---|---|---|
| Rocksalt - MgO | +1.965 | +0.460 | $O(10^{-8})$ |
| Rocksalt - TiO | +0.763 | −2.155 | $O(10^4)$ |
| Anatase - $TiO_2$ | +0.039 | −1.410 | $O(10^{-10})$ |
| $Cr_2O_3$ | +0.595 | −4.279 | $O(10^{-4})$ |

It can be observed from Table 2 that among the tested group, MgO is the most corrosion resistant species, as is evidenced by MgO's relatively large adsorption energies. TiO and $TiO_2$ are also reasonably resistant, especially in an acidic environment (exposure to F anions). Yet, only TiO is electrically conductive.

Examples 4-8

Figure 3A:
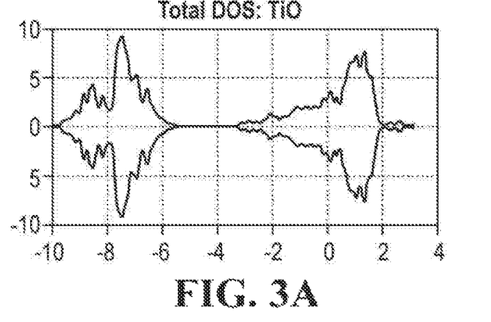
FIGS. 3A-3E depict plots showing density functional theory (DFT) calculated electronic density of state for various compositions within Mg$_x$Ti$_{1-x}$O systems disclosed herein.
Figure 3B:
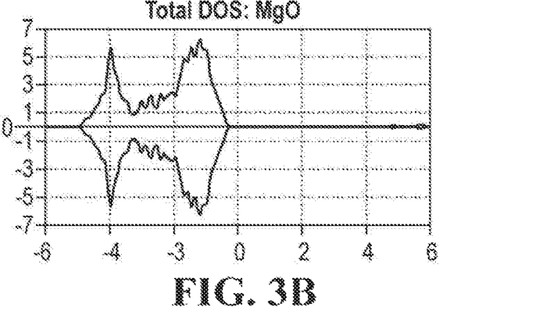

DFT was used to assess conductivity of Examples 4-8. DFT calculated electronic density of state (DOS) was assessed for the MgO—TiO system, specifically Example 4: TiO, Example 5: MgO, Example 6: Mg0.97Ti0.3O, Example 7: Mg0.94Ti0.06O, and Example 8: Mg0.875Ti0.125O. FIGS. 3A-3E show results of the assessment. In FIGS. 3A-3E, zero in the x-axis is set at the Fermi level ($E_F$), indicating whether a specific example substance is electrically conductive or insulating. As can be observed from FIG. 3A, Example 4 occupies $E_F$, which indicated metallic state and conductivity. In contrast, Example 5 in FIG. 3B shows unoccupied $E_F$. Indeed, a large bandgap can be seen in FIG. 3B between the unoccupied and occupied state. Example 5, MgO, is an electrical insulator.

Figure 3C:
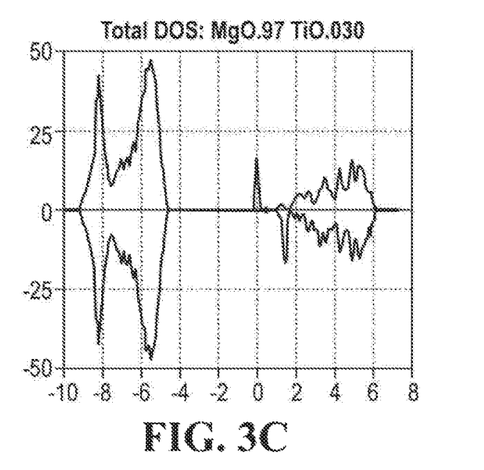
Figure 3D:
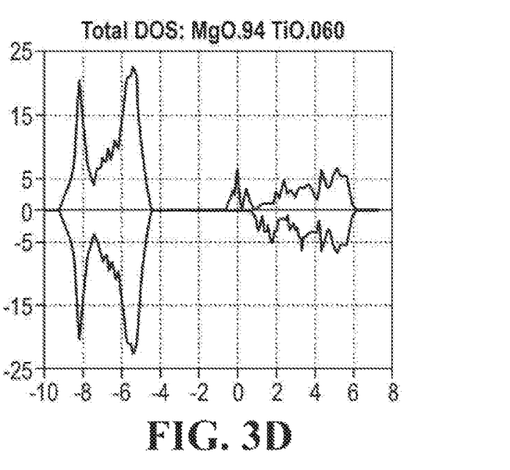
Figure 3E:
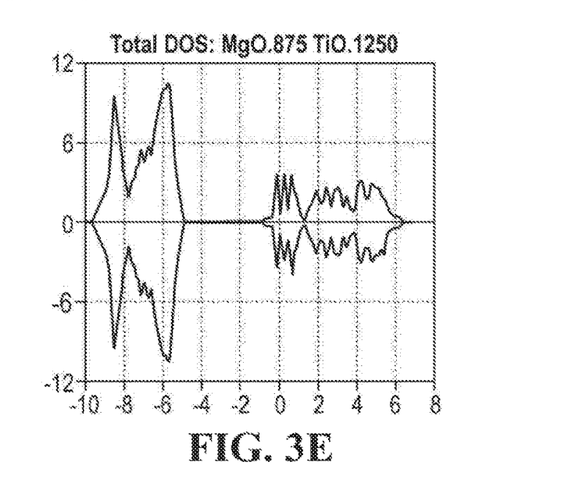

Examples 6-8, DOS of which is depicted in FIGS. 3C-E, respectively, all occupy $E_F$, which indicated electrical conductivity of various compositions within the $Mg_xTi_{1-x}O$ systems.

Additionally, a variety of methods to synthetize the anti-corrosive and electrically conductive material are disclosed herein. In at least one embodiment, a method may include forming a $Ti_xMg_{1-x}$ intermetallic alloy at a temperature above about 80° C., 90° C., 100° C., 110° C., 120° C., 130° C., 140° C., 150° C., or greater. The alloy may be formed by physical vapor deposition, chemical vapor deposition, evaporation, sputtering, electrochemical deposition, or the like. The method may further include oxidizing the $Ti_xMg_{1-x}$ intermetallic alloy. The oxidizing may be performed in an environment which is substantially or predominantly oxygen-free to suppress oxidation of TiO into $TiO_2$. A substantially oxygen-free environment refers to an environment having an amount of oxygen which is insufficient to induce oxidation of TiO into $TiO_2$. The environment may be entirely oxygen free.

To control the degree of oxidation of the alloy, one or more oxidizing and/or reducing agents may be added. A non-limiting example of the agent may be gas species such as Ar, $N_2$, ambient air, or $O_2$, as well as a mixture of gases, which may be supplied into the furnace where oxidizing is taking place. Alternatively or in addition to the agent(s), temperature in the furnace may be varied. For example, a higher temperature may induce more reducing conditions. Oxidizing the $Ti_xMg_{1-x}$ intermetallic alloy may yield $Ti_xMg_{1-x}O_y$ material, where x is a number from 0 to ≤1 and y is a number from 1 to ≤2.

An alternative method of synthetizing the material disclosed herein may include doping or substituting the MgO powder with Ti-containing chemical precursors such as $TiCl_2$. The substitution may be followed by a secondary heat treatment with an inert gas such as $N_2$, Ar, or the like which may yield a desired degree of oxidation.

Figure 4:
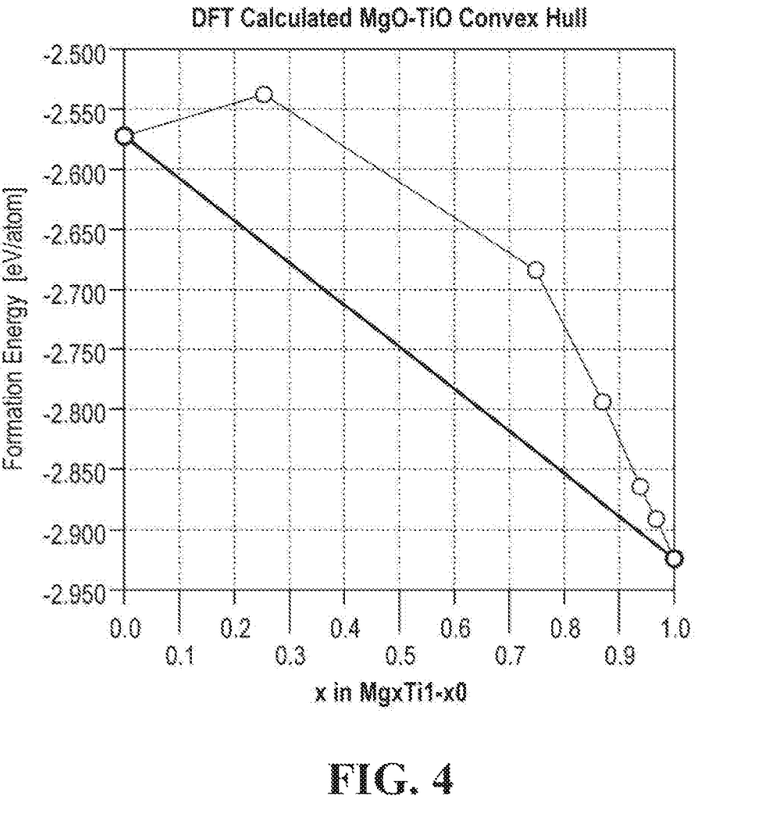
FIG. 4 shows a DFT calculated MgO—TiO convex hull, where the formation energy of various Ti$_x$Mg$_{1-x}$O mixtures and their miscibility are presented.

With respect to doping, it was discovered that only a relatively small amount of Ti may be doped or substituted into MgO and vice versa. The DFT calculations were used to generate a MgO—TiO convex hull, depicted in FIG. 4, where the formation energy of various $Ti_xMg_{1-x}O$ mixtures and their miscibility are presented. As can be seen in FIG. 4, there is a miscibility gap between the MgO and TiO bulk structure indicating the low doping ability of TiO with respect to MgO. For the purposes of this application, formation of electrically insulating $TiO_2$ is not desirable as the goal is to have TiO in the material. Thus, the calculation contemplated Mg-rich regions of the phase diagram in FIG. 4 for $Mg_xTi_{1-x}O$, i.e., x=0.75, 0.88, 0.94, and 0.97, with the hull distance of 150, 85, 36, and 22 meV/atom, respectively. The results indicate than only about less than 3 at. % of Ti, at ambient temperature, may be doped into MgO. The at. % corresponds to ~25 meV/atom. The DFT further indicates that at higher temperatures (aided by the secondary heat-treatment), it may be feasible to substitute up to 10 at. % of MgO by TiO. At a higher concentration than the 3 at. % or 10 at. % respectively, TiO and MgO may either form a solid solution or weakly phase-separate with a distinct nanodomain region.

A yet alternative method of preparation of the material of formulas (I), (II) may include synthetizing the material by atomic layer deposition, where the final film has a Ti:Mg ratio below ½, where TiO can be deposited on Mg, MgO, or both at varying temperatures from about 100 to 250° C., 120 to 220° C., or 150 to 200° C. The method may include using a precursor such as Tetrakis(dimethylamido)titanium, followed by optional annealing at an elevated temperature.

Alternatively still, a method of preparation of the material of formula (I), (II) may include preparing the material by physical vapor deposition, chemical vapor deposition, evaporation, sputtering, or the like. The material may have a Ti:Mg ratio below ½, where $MgO_x$ and $TiO_y$ are codeposited at appropriate ratios from stoichiometric targets or where MgO$_x$ and TiO$_y$ are deposited in a reactive oxygen environment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An anticorrosive and conductive substrate comprising:
   a bulk portion; and
   a surface portion including a magnesium titanium oxide material including both an electrically conductive TiO phase and an electrically insulating MgO phase, and including less than about 15 atomic % Ti,
   wherein at least about 50% of the magnesium titanium oxide material includes both MgO and TiO having cubic crystal structures, and wherein the magnesium titanium material is configured to impart anticorrosive and conductive properties to the substrate.

2. The substrate of claim 1, wherein the magnesium titanium oxide material includes between about 3 and 10 atomic % Ti.

3. The substrate of claim 1, wherein the magnesium titanium oxide material further includes MgO and TiO nanodomains.

4. The substrate of claim 3, wherein the TiO nanodomains are electrically conductive.

5. The substrate of claim 1, wherein electrical conductivity of the material is greater than about 100 S cm$^{-1}$.

6. The substrate of claim 1, wherein an interfacial contact resistance between the substrate and the material is less than about 0.001 to 0.2 Ohm cm$^2$.

7. The substrate of claim 1, wherein the bulk portion is steel.

8. The substrate of claim 1, wherein the bulk portion is glass and the material is configured to form a transparent film on the surface portion.

9. The substrate of claim 1, wherein both MgO and TiO have matching cubic crystal structures.

10. The substrate of claim 1, wherein the material further includes a solid solution of TiO distributed within the cubic crystal structure of MgO.

11. The substrate of claim 10, wherein the distribution is uniform.

12. An anticorrosive and conductive substrate comprising:
    a bulk portion; and
    a surface portion including a magnesium titanium oxide material having both an electrically insulating, chemically inert MgO phase and an electrically conductive TiO phase, and including more than about 10 atomic % Ti such that the material includes:
    MgO cubic crystal structures and TiO cubic crystal structures, and
    MgO electrically insulating nanodomains and TiO electrically conductive nanodomains,
    the material being configured to impart anticorrosive and conductive properties to the substrate.

13. The substrate of claim 12, wherein the material further includes at least one electrically conductive ordered Mg-Ti-O compound.

14. The substrate of claim 13, where the at least one electrically conductive ordered Mg-Ti-O compound includes Mg$_2$Ti$_7$O$_{15}$.

15. The substrate of claim 12, wherein both MgO and TiO have matching cubic crystal structures.

16. The substrate of claim 12, wherein the material further includes a solid solution of TiO distributed within the cubic crystal structure of MgO.

* * * * *